US012602202B2

(12) United States Patent
Najafi et al.

(10) Patent No.: US 12,602,202 B2
(45) Date of Patent: Apr. 14, 2026

(54) FINITE STATE MACHINE-BASED BIT-STREAM GENERATOR FOR LOW-DISCREPANCY STOCHASTIC COMPUTING

(71) Applicant: University of Louisiana at Lafayette, Lafayette, LA (US)

(72) Inventors: Mohammadhassan Najafi, Lafayette, LA (US); Mohsen Imani, Irvine, CA (US); Sina Asadi, Lafayette, LA (US)

(73) Assignee: UNIVERSITY OF LOUISIANA AT LAFAYETTE, Lafayette, LA (US)

( * ) Notice: Subject to any disclaimer, the term of this patent is extended or adjusted under 35 U.S.C. 154(b) by 656 days.

(21) Appl. No.: 17/866,299

(22) Filed: Jul. 15, 2022

(65) Prior Publication Data

US 2023/0025438 A1     Jan. 26, 2023

Related U.S. Application Data

(60) Provisional application No. 63/222,589, filed on Jul. 16, 2021.

(51) Int. Cl.
G06F 7/74          (2006.01)
G06F 17/18         (2006.01)

(52) U.S. Cl.
CPC ............... G06F 7/74 (2013.01); G06F 17/18 (2013.01)

(58) Field of Classification Search
CPC .......... H03M 7/26; G06F 7/582; G06F 7/586; G06F 7/70; G06F 7/74; G06F 7/76; G06F 9/4498; G06F 17/18; G06N 3/047
See application file for complete search history.

(56) References Cited

PUBLICATIONS

See NIST, finite state machine, 2000 found at https://xilinux.nist. gov/dads/HTML/finiteStateMachine.html (Year: 2000).*
M.L. Bors, What is a Finite State Machine, 2018 found at https:// medium.com/@mlbors/what-is-a-finite-state-machine-6d8dec727e2C (Year: 2018).*
S. Liu et al., Toward Energy-Efficient Stochastic Circuits Using Parallel Sobol Sequences, IEEE Transactions on Very Large Scale Integration (VLSI) Systems, vol. 26, No. 7, 2018 (Year: 2018).*
Z. Chen et al., Optimizing Stochastic Computing for Low Latency Inference of Convolutional Neural Networks, ICCAD'20, ACM 2020 (Year: 2020).*
S. Liu, W. Gross, J. Han, Introduction to Dynamic Stochastic Computing, IEEE Circuits and Systems Magazine, 2020 (Year: 2020).*
S. Joe et al., Remark on Algorithm 659: Implementing Sobol's Quasirandom Sequence generator, ACM Transactions on Mathematical Software, vol. 29, No. 1, 2003 p. 49-57 (Year: 2003).*

(Continued)

*Primary Examiner* — Emily E Larocque
(74) *Attorney, Agent, or Firm* — Ted M. Anthony; Sarah B. Dupont

(57)          ABSTRACT

Disclosed herein is a finite state machine-based low-discrepancy bit-stream generator that support generation of any number of independent low-discrepancy bit-streams. Here, the order of bit selection by the FSM of the bit-stream generator is determined based on the distribution of numbers in the Sobol sequences. An independent LD bit-stream is generated by setting up the FSM using a different Sobol sequence. The available space can then be used to improve fault tolerance.

1 Claim, 8 Drawing Sheets

(56) References Cited

PUBLICATIONS

S. Asadi et al, A Low-Cost FSM-based Bit-Stream Generator for
Low-Discrepancy Stochastic Computing, EDAA 2021 (Year: 2021).*
One-Hot Encoded Finite State Machines, University of New Mexico,
ECE 238L, 2006 (Year: 2006).*

* cited by examiner

Figures 5, 6:
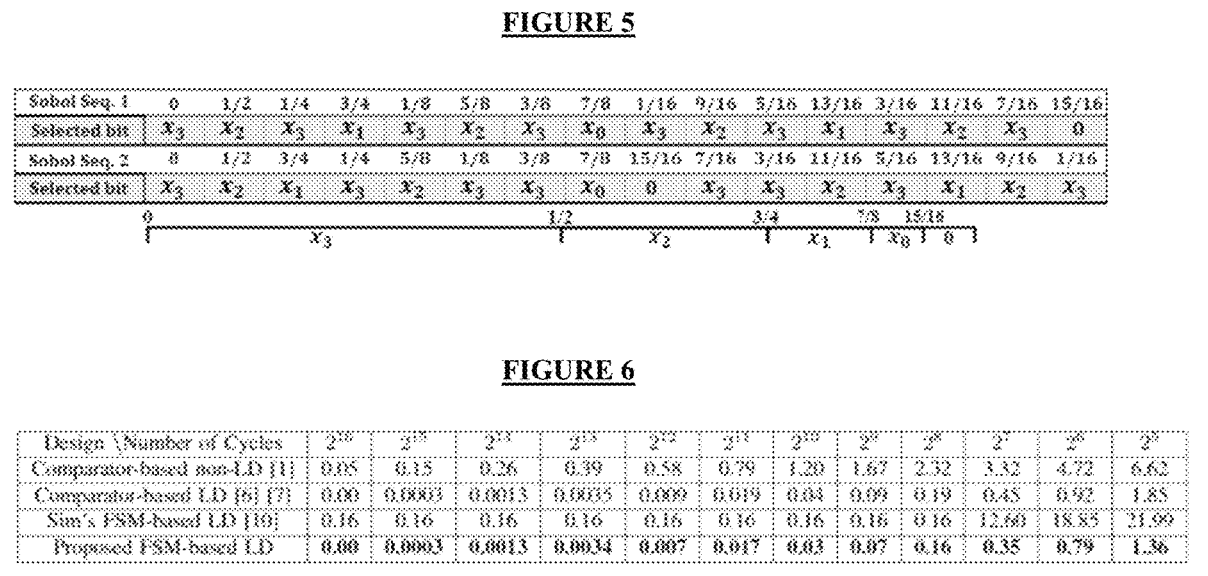

| Sobol Seq. 1 | 0 | 1/2 | 1/4 | 3/4 | 1/8 | 5/8 | 3/8 | 7/8 | 1/16 | 9/16 | 5/16 | 13/16 | 3/16 | 11/16 | 7/16 | 15/16 |
|---|---|---|---|---|---|---|---|---|---|---|---|---|---|---|---|---|
| Selected bit | $x_3$ | $x_2$ | $x_3$ | $x_1$ | $x_3$ | $x_2$ | $x_3$ | $x_0$ | $x_3$ | $x_2$ | $x_3$ | $x_1$ | $x_3$ | $x_2$ | $x_3$ | 0 |
| Sobol Seq. 2 | 0 | 1/2 | 3/4 | 1/4 | 5/8 | 1/8 | 3/8 | 7/8 | 15/16 | 7/16 | 3/16 | 11/16 | 5/16 | 13/16 | 9/16 | 1/16 |
| Selected bit | $x_3$ | $x_2$ | $x_1$ | $x_3$ | $x_2$ | $x_3$ | $x_3$ | $x_0$ | 0 | $x_3$ | $x_3$ | $x_2$ | $x_3$ | $x_1$ | $x_2$ | $x_3$ |

| Design \Number of Cycles | $2^{16}$ | $2^{15}$ | $2^{14}$ | $2^{13}$ | $2^{12}$ | $2^{11}$ | $2^{10}$ | $2^{9}$ | $2^{8}$ | $2^{7}$ | $2^{6}$ | $2^{5}$ |
|---|---|---|---|---|---|---|---|---|---|---|---|---|
| Comparator-based non-LD [1] | 0.05 | 0.15 | 0.26 | 0.39 | 0.58 | 0.79 | 1.20 | 1.67 | 2.32 | 3.32 | 4.72 | 6.62 |
| Comparator-based LD [6] [7] | 0.00 | 0.0003 | 0.0013 | 0.0035 | 0.009 | 0.019 | 0.04 | 0.09 | 0.19 | 0.45 | 0.92 | 1.85 |
| Sim's FSM-based LD [10] | 0.16 | 0.16 | 0.16 | 0.16 | 0.16 | 0.16 | 0.16 | 0.16 | 0.16 | 12.60 | 18.85 | 21.99 |
| Proposed FSM-based LD | 0.00 | 0.0003 | 0.0013 | 0.0034 | 0.007 | 0.017 | 0.03 | 0.07 | 0.16 | 0.35 | 0.79 | 1.36 |

| Design | $n{=}4$ $i{=}2$ | $n{=}4$ $i{=}3$ | $n{=}4$ $i{=}4$ | $n{=}8$ $i{=}2$ | $n{=}8$ $i{=}3$ | $n{=}8$ $i{=}4$ |
|---|---|---|---|---|---|---|
| Comparator-based LD (Limited) | 366 | 627 | 888 | 1087 | 1944 | 2801 |
| This work - FSM-based LD (Limited) | 188 | 280 | 337 | 451 | 781 | 1026 |
| Comparator-based LD (Full) [6], [7] | 1005 | 3740 | 9127 | 3361 | 13193 | 32406 |
| This work - FSM-based LD (Full) | 300 | 746 | Large | Large | Large | Large |
| Comp-based LD + Rotation (Full) [7] | 456 | 806 | 1156 | 1277 | 2324 | 3371 |
| This work FSM LD + Rotation (Full) | 353 | 609 | 864 | 751 | 1495 | 2149 |

FIGURE 13

| Parallel Design | 1× | | 2× | | 4× | | 8× | |
|---|---|---|---|---|---|---|---|---|
| | Area | CP | Area | CP | Area | CP | Area | CP |
| Comparator-based [12] | 1013 | 0.45 | 1245 | 0.47 | 1658 | 0.47 | 2484 | 0.47 |
| FSM-based (Sob.1) | 246 | 0.37 | 266 | 0.35 | 267 | 0.34 | 250 | 0.30 |
| FSM-based (Sob.2) | 366 | 0.39 | 375 | 0.42 | 422 | 0.41 | 455 | 0.39 |
| FSM-based (Sob.3) | 526 | 0.42 | 504 | 0.43 | 512 | 0.40 | 485 | 0.39 |
| FSM-based (Sob.4) | 471 | 0.40 | 483 | 0.43 | 513 | 0.39 | 485 | 0.37 |
| FSM-based (Sob.5) | 526 | 0.42 | 479 | 0.41 | 483 | 0.41 | 487 | 0.39 |

FIGURE 14

| LD Bit-Stream Generator | Area $(\mu m^2)$ | Input Width | Injected Soft Error | | | | | |
|---|---|---|---|---|---|---|---|---|
| | | | 1% | 2% | 5% | 10% | 20% | 30% |
| Comparator-based | 337 | 4 | 3.8 | 5.4 | 7.5 | 9.4 | 13.3 | 17.5 |
| | 1013 | 8 | 1.1 | 1.6 | 3.0 | 5.3 | 10.2 | 15.1 |
| | 2054 | 12 | 0.56 | 1.04 | 2.5 | 5.0 | 10.0 | 15.0 |
| Comparator-based + 3-MR | 1179 | 4 | 0.18 | 0.68 | 3.0 | 6.0 | 9.6 | 14.0 |
| | 3349 | 8 | 0.24 | 0.53 | 1.02 | 2.1 | 5.5 | 11.3 |
| | 6624 | 12 | 0.06 | 0.12 | 0.38 | 1.4 | 5.3 | 10.6 |
| Proposed FSM-based | 165 | 4 | 3.9 | 4.8 | 7.3 | 11.0 | 17.2 | 21.5 |
| | 366 | 8 | 1.4 | 2.6 | 6.0 | 10.8 | 17.7 | 21.8 |
| | 742 | 12 | 1.3 | 2.5 | 6.0 | 10.8 | 17.7 | 21.7 |
| Proposed FSM-based + 3-MR | 587 | 4 | 0.11 | 0.42 | 2.1 | 4.9 | 9.9 | 16.0 |
| | 1266 | 8 | 0.14 | 0.34 | 1.00 | 2.9 | 9.3 | 16.5 |
| | 2377 | 12 | 0.05 | 0.18 | 0.95 | 3.5 | 11.3 | 18.2 |
| Proposed FSM-based + 5-MR | 1051 | 4 | 0.006 | 0.04 | 0.46 | 2.3 | 7.1 | 13.2 |
| | 2252 | 8 | 0.005 | 0.04 | 0.33 | 1.1 | 5.6 | 13.4 |
| | 4090 | 12 | 0.004 | 0.02 | 0.19 | 1.1 | 6.6 | 15.5 |

FIGURE 15

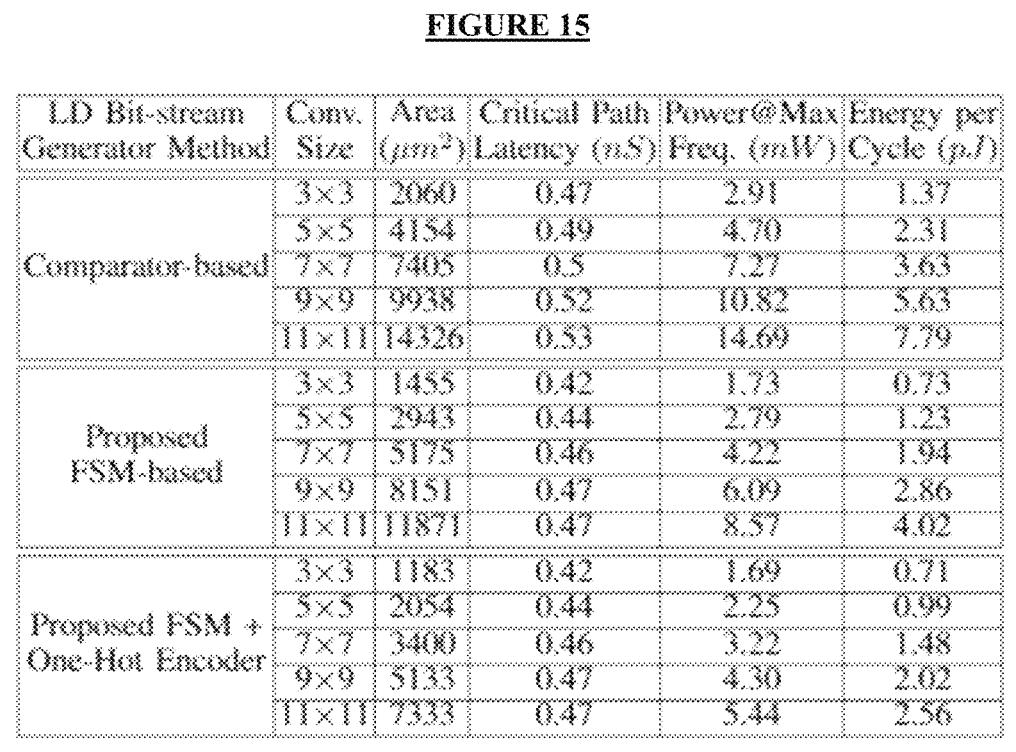

| LD Bit-stream Generator Method | Conv. Size | Area ($\mu m^2$) | Critical Path Latency ($nS$) | Power@Max Freq. ($mW$) | Energy per Cycle ($pJ$) |
|---|---|---|---|---|---|
| Comparator-based | 3×3 | 2060 | 0.47 | 2.91 | 1.37 |
| | 5×5 | 4154 | 0.49 | 4.70 | 2.31 |
| | 7×7 | 7405 | 0.5 | 7.27 | 3.63 |
| | 9×9 | 9938 | 0.52 | 10.82 | 5.63 |
| | 11×11 | 14326 | 0.53 | 14.69 | 7.79 |
| Proposed FSM-based | 3×3 | 1455 | 0.42 | 1.73 | 0.73 |
| | 5×5 | 2943 | 0.44 | 2.79 | 1.23 |
| | 7×7 | 5175 | 0.46 | 4.22 | 1.94 |
| | 9×9 | 8151 | 0.47 | 6.09 | 2.86 |
| | 11×11 | 11871 | 0.47 | 8.57 | 4.02 |
| Proposed FSM + One-Hot Encoder | 3×3 | 1183 | 0.42 | 1.69 | 0.71 |
| | 5×5 | 2054 | 0.44 | 2.25 | 0.99 |
| | 7×7 | 3480 | 0.46 | 3.22 | 1.48 |
| | 9×9 | 5133 | 0.47 | 4.30 | 2.02 |
| | 11×11 | 7333 | 0.47 | 5.44 | 2.56 |

FINITE STATE MACHINE-BASED BIT-STREAM GENERATOR FOR LOW-DISCREPANCY STOCHASTIC COMPUTING

CROSS REFERENCE TO RELATED APPLICATIONS

This application claims priority to the U.S. Provisional Application No. 63/222,589 titled "FSM-Based Bit-Stream Generator for Low-Discrepancy Stochastic Computing" filed on Jul. 16, 2021.

STATEMENT REGARDING FEDERALLY SPONSORED RESEARCH OR DEVELOPMENT

This invention was supported in part by the National Science Foundation, Grant No. 2019511.

REFERENCE TO A "SEQUENCE LISTING," A TABLE, OR A COMPUTER PROGRAM

Not applicable.

FIELD OF THE INVENTION

The field of the invention relates to stochastic computing. Specifically, the invention relates to the development of bit-stream generator capable of generating values for use in low-discrepancy stochastic computing.

DESCRIPTION OF THE DRAWINGS

The drawings constitute a part of this specification and include exemplary embodiments of the Finite State Machine-Based Bit-Stream Generator for Low-Discrepancy (LD) Stochastic Computing (SC), which may be embodied in various forms. It is to be understood that in some instances, various aspects of the invention may be shown exaggerated or enlarged to facilitate an understanding of the invention. Therefore, the drawings may not be to scale. For purposes of clarity, not every component may be labeled in every drawing.

FIG. 5 shows the first 16 numbers of two Sobol sequences and their corresponding selected bits in a 4-bit data based on Algorithm 1

FIG. 6 is a table of the mean absolute error (%) comparison of the proposed and the known in the art stochastic designs when multiplying two 8-bit precision data.

FIG. 13 is a table evaluating the hardware area ($\mu m^2$) and critical path latency (CP) (nS) of the comparator-based and the FSM-based LD bit-stream generator for the case of converting 8-bit precision data.

FIG. 14 is a table evaluating the mean absolute error (%) comparison of different LD bit-stream generators when injecting different rates of soft error.

FIG. 15 is a table of the synthesis results of the bit-stream generators for the implemented convolution designs.

BACKGROUND OF THE INVENTION

Stochastic Computing (SC), an unconventional computing paradigm processing random bit-streams, has been used for low-cost and noise-tolerant implementation of complex arithmetic operations. SC designs consistently achieve 50 to 100 times reductions in gate count over a wide range of applications in signal, image, and video processing, compared to conventional binary radix designs.

Figure 1:
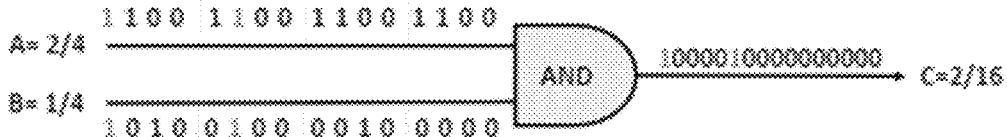
FIG. 1 shows an example of multiplication using stochastic bit-streams and AND gate.

Implementing complex operations with simple hardware and the ability to tolerate high rates of noise are the primary advantages of SC. For example, multiplication is a costly common operation in convolutional neural networks; but in SC, can be performed using a single AND gate (see FIG. 1). But there are drawbacks to SC that can deteriorate the savings seen from the lower-cost operations. To process using SC, the input data is converted from binary to random bit-streams, which are typically generated from pseudo-random number generators. Computation on pseudo-random bit-streams suffers from random fluctuations. This often leads to processing of very long bit streams to reach acceptable outputs, which increases processing time and energy consumption, making SC designs inefficient compared to their binary counterparts.

Figure 2:
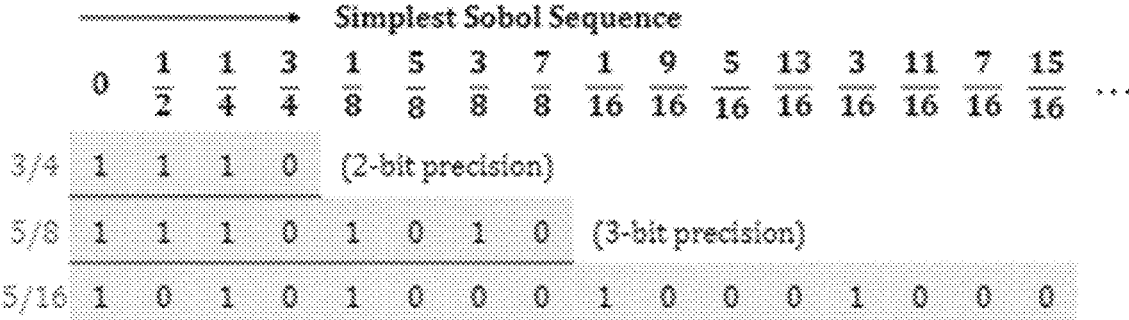
FIG. 2 shows examples of LD bit-streams with different precisions generated using the simplest Sobol sequence.

Low-discrepancy (LD) bit-streams known in the art such as Halton- and Sobol-based bit-streams have been proposed to improve the accuracy and reduce the processing time of SC. 1s and 0s are uniformly spaced in these bit-streams. Random fluctuations are removed from bit-stream generation, generating deterministic and accurate bit-streams. Progressive precision of Sobol sequences, in particular, has made them popular for LD bit-stream generation. The first $2^n$ numbers of any Sobol sequence include all possible n-bit precision values in the [0,1] interval. This allows 2n-bit Sobol-based bit-streams to precisely represent any n-bit precision value. FIG. 2 shows the first 16 numbers of the simplest Sobol sequence and examples of LD bit-streams generated using this Sobol sequence. There, a '1' is generated in the bit-stream if the Sobol number is less than the target number.

Figure 3:
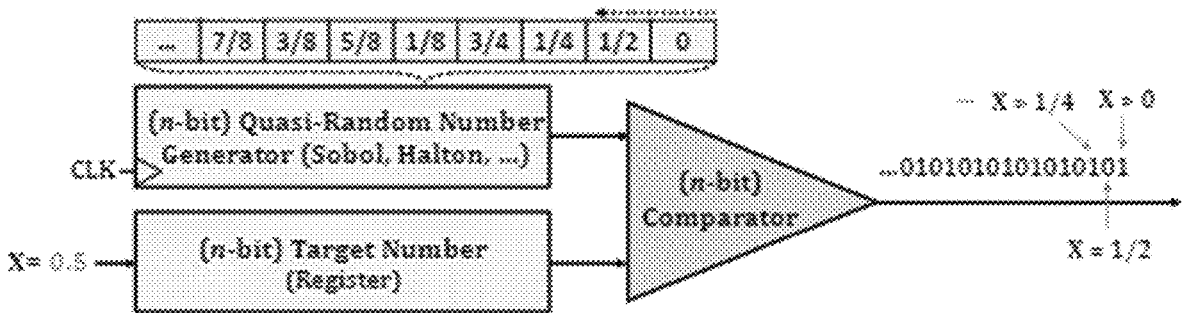
FIG. 3 depicts a conventional comparator-based LD bit-stream generator. A '1' is generated in each cycle if the random number is less than the target number.

The conventional method for generating LD bit-streams is shown in FIG. 3. A quasi-random number (e.g., a Sobol number from a Sobol sequence) is compared to a target number using a binary comparator. The output of this comparison generates one bit of the LD bit-stream in each cycle. Quasi-random number generators, however, are costly. A 4-, 8-, and 16-bit precision Sobol sequence generator takes 2.8×, 4.7×, and 9.1×, respectively, more hardware area cost than the same-precision pseudo-random number generator. The high hardware cost limits the potential benefits and the scalability of the conventional comparator-based LD bit-stream generator.

An FSM-based LD bit-stream generator to convert data from binary to LD bit-stream was recently introduced in the art. This generator selects $x_{n-i}$ or the $(n-i)^{th}$ bit of the binary input X first at cycle $2^{i-1}$ and thereafter every $2^i$ cycles. The hardware cost of such a generator is considerably lower than that of the comparator-based LD generator. Yet, the challenge is that the FSM-based LD bit-stream generator can only generate one fixed LD pattern. Hence, it cannot be used in SC designs in which multiple independent LD bit-streams are needed. This includes multi-input multipliers, scaled adders, and the ReSC-based designs such as the Gamma correction circuit, to name a few. These designs still have to employ the conventional comparator-based LD generators.

SUMMARY OF THE INVENTION

The disclosed invention is a low-cost FSM-based LD bit-stream generator which supports generation of any number of LD patterns, instead of the singular-pattern generator known in the art. The disclosed method creates different LD patterns based on different Sobol sequences, allowing the generator to generate any number of independent bit-streams. SC systems implemented based on the disclosed generator are able to produce completely accurate results, the same as the results from the conventional binary counterparts.

Evaluating the cost of the proposed bit-stream generator in implementing stochastic multipliers with different number of inputs and precisions shows area cost reduction of up to 80% compared to the case of using the comparator-based generator. While the proposed generator is hardware efficient for common computations with 8-10 bit precision, the cost increases considerably when the precision exceeds 12 bits. To address this limitation, the proposed generator is integrated with a rotation method of processing bit-streams and achieves a low-cost implementation for high-precision computations.

Also disclosed is a parallel design for the proposed generator. Depending on the level of parallelism, the developed design provides more than 60 to 80 percent cost saving compared to the state-of-the-art parallel LD bit-stream generators. The fault tolerance of the novel generator and a comparator-based LD bit-stream generator are also evaluated. The evaluations show that the low-cost advantage of the proposed design allows the use of additional techniques to improve the fault-tolerance of the bit-stream generator. The invention shows the effectiveness of using the proposed generator by implementing a SC-based convolution engine. In a further embodiment, disclosed is a method to further reduce the cost of bit-stream generation when generating a large number of bit-streams.

DETAILED DESCRIPTION OF THE INVENTION

The LD bit-stream generator converts an n-bit precision binary data into a $2^n$-bit bit-stream with uniformly spaced 1's and 0's. $x_i$ or the $i^{th}$ bit of binary input X appears in the LD bit-stream exactly $2^i$ times. The binary input data is connected to the main inputs of an (n+1)-to-1 multiplexer (MUX). A $2^n$-state FSM is connected to the select input of the MUX to select one of the input bits at any cycle. The FSM controls the order of bit selection and the number of times each input bit is selected. Different LD bit-selection orders are needed to generate independent LD bit-streams.

Figure 4:
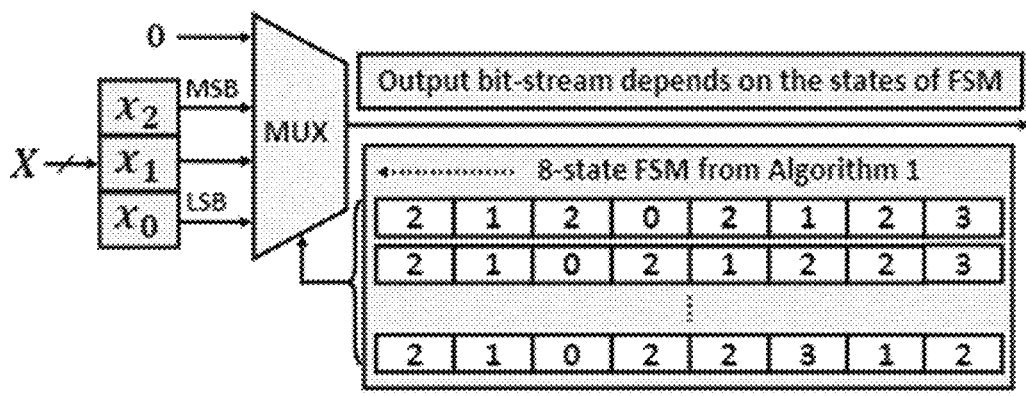
FIG. 4 depicts the FSM-based LD bit-stream generator for n=3. The FSM selects the input bits based on one of the patterns produced by Algorithm 1

FIG. 4 depicts the structure of the novel bit-stream generator for n=3. As seen in that figure, a three-bit input X, comprising $x_0$, $x_1$, and $x_2$, is an input to the MUX, wherein $x_2$ is the most significant bit (MSB) and $x_0$ is the least significant bit (LSB). Zero is also an input to the MUX. Also, an input is an 8-state finite state machine (FSM).

The FSM directs how the bit selection orders are determined for the bit-stream generator disclosed herein. Prior works in the art have shown that, among different types of stochastic bit-streams, the Sobol sequence-based bit-streams provide the fastest convergence to the target value. Independence between different Sobol-based LD bit-streams is provided by using different Sobol sequences in converting input data into bit-stream representation. Here, we propose a method (Algorithm 1) to determine the order of bit selection by the FSM of the bit-stream generator based on the distribution of numbers in the Sobol sequences. An independent LD bit-stream is generated by setting up the FSM using a different Sobol sequence. Note that this step is performed offline and the structure of the FSM will not change after implementation. When the FSM is designed, it is described using a hardware description language (HDL) such as Verilog and then synthesized using an HDL synthesis tool such as Synopsys Design Compiler.

Algorithm 1 below demonstrates the procedure. Each Sobol number from a Sobol sequence determines one state of the FSM. Assume $S_k$ is the $k^{th}$ number of the Sobol sequence. If $(2^{m-1}-1)/2^{m-1} \leq S_k < (2^{m-1})/2^m$, where m is a number between 1 to n determined by the value of $S_k$, and n is the data-width, $x_{n-m}$ or the $(n-m)^{th}$ bit of binary input X (that we want to convert from binary to bit-stream), should be selected by the FSM. For example, if $\frac{1}{2} \leq S_k < \frac{3}{4}$, m is 2 and the $(n-2)^{th}$ bit of the input data should be selected by the FSM.

---

Algorithm 1:

---

```
Input: Sobol seq (Sobol-num [0:2ⁿ − 1]), data-width (n)
Output: A 2ⁿ -state FSM
for k = 0, 1, . . ., 2ⁿ − 1 do
    if 0 ≤ Sobol-num(k) < ½
    |   FSM output − n − 1
    else if ½ ≤ Sobol-num(k) < ¾
    |   FSM output − n − 2
        .
        .
    else if (2ⁿ ⁻ ¹ − 1)/ 2ⁿ ⁻ ¹ ≤ Sobol-num(k) < (2ⁿ − 1)/ 2ⁿ
    |   FSM output = 0
    else
    |   FSM output = n
```

---

By way of example, assume a 4-bit binary data is to be converted to a 16-bit LD bit-stream. FIG. 5 shows the first 16 numbers of two different Sobol sequences and their corresponding selected bits (i.e., FSM states) based on Algorithm 1.

Accuracy. The accuracy of the proposed bit-stream generator can be compared to the state-of-the-art LD bit-stream generators and also to the conventional comparator-based non-LD (pseudo-random) generator by exhaustively testing multiplication of two 8-bit precision data. For the non-LD generator, two different 16-bit linear feedback shift registers (LFSRs) are used as the number sources. A 256-state design of the FSM-based LD generator and a unary bit-stream generator (built from a pair of 8-bit counter and comparator) are used to convert the two inputs. The comparator-based LD and the novel FSM-based generator use the first and the second Sobol sequences from the MATLAB built-in Sobol sequence generator as their LD number sources. FIG. 6 provides a table comparing the mean absolute errors (MAEs) of these designs for different bit-stream lengths. The inventors multiplied the measured MAE of each design by 100 and report it as a percentage.

Due to random fluctuations in pseudo-random bit-streams and correlation between bit-streams, the non-LD design cannot provide comparable accuracy to the LD designs. The output bit-streams produced by prior art designs have a period of $2^8$ cycles and so their accuracy never improves after $2^8$ cycles. Some prior art LD designs achieve a higher accuracy (i.e., a lower error rate) than the non-LD only when processing bit-streams of $2^8$ (or multiples of $2^8$) bits. Unary bit-streams (i.e., bit-streams with first all 1's and then all 0's or vice versa) suffer from truncation error. Hence, prior art designs that convert the second input to a unary bit-stream show poor results when truncating the bit-streams and processing bit-streams shorter than $2^8$ bits (e.g., $2^7$ bits). For small bit-stream lengths, both of the non-LD and the LD comparator-based designs show a better performance than other prior art designs.

Converting two n-bit precision numbers to two $2^{2n}$-bit independent LD bit-streams leads to completely accurate multiplication results when logical-ANDing the generated bit-streams. The comparator-based and the FSM-based LD design disclosed herein both convert the input data into independent LD bit-streams. Consequently, as reported in FIG. 6 for the case of multiplying two 8-bit precision data, both of these designs are able to produce completely accurate results (zero error rate) when processing for $2^{16}(=2^{2\times8})$ cycles. They also show low error rates when processing shorter bit-streams. However, as shown herein, the disclosed inventive generator has significantly lower hardware cost for computation precisions not exceeding 12 bits. For more precise computations, the novel FSM-based design can be integrated with a rotation-based deterministic approach for hardware efficiency.

Figures 7, 8:
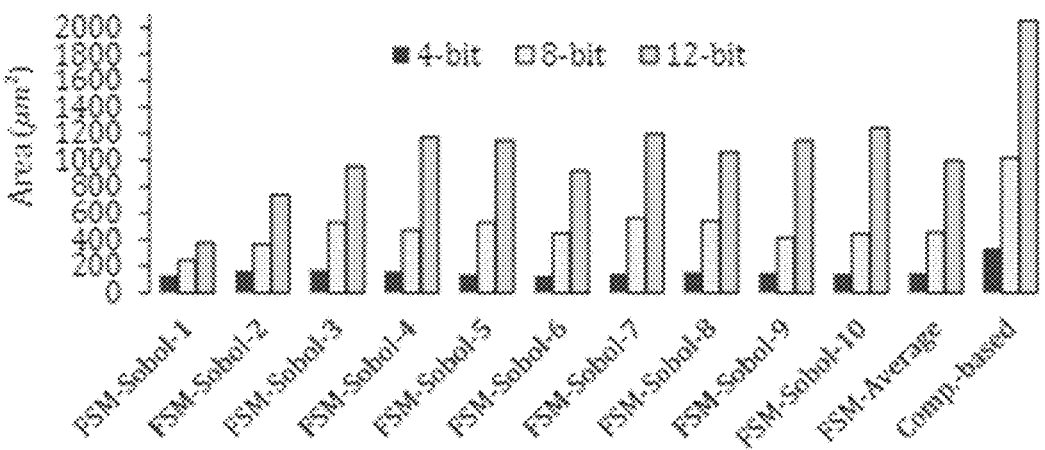
FIG. 7 depicts hardware area cost of the proposed LD bit-stream generator for different precisions (4, 8, and 12 bits) and LD patterns (Sobol 1-10).
FIG. 8 is a table of the hardware area cost ($\mu m^2$) of the bit stream generators for processing different number of inputs (i) and data precisions (n).

Hardware Cost—Single Bit Stream Generator. The hardware cost of the comparator-based LD generator depends on the required precision (bit-stream length) and is independent of the selected Sobol sequence. To generate a LD bit-stream of $2^n$ bit length, one n-bit Sobol sequence generator and one n-bit binary comparator are needed. Different Sobol sequences are generated by changing the values of direction vectors in the sequence generator. The hardware cost of the FSM-based generator, however, not only depends on the precision but also depends on the selected LD pattern (i.e., the selected Sobol sequence in Algorithm 1). This is because the structure of the FSM changes with a different bit-selection order. To illustrate, FIG. 7 compares the hardware area cost of the novel FSM-based LD generator for different precisions (n=4, 8, 12) and LD patterns (based on ten different Sobol sequences). In testing, the designs were synthesized using the Synopsys Design Compiler v2018.06 with the 45 nm Free PDK gate library. As can be seen, the proposed generator provides on average 56, 55, and 51 percent hardware area saving for 4-, 8-, and 12-bit precision bit-stream generation, respectively, compared to the comparator-based LD generator.

Hardware Cost—Multiple Bit-Stream Generators. The hardware area cost of the proposed bit-stream generator and the prior art comparator-based LD generator are compared in FIG. 8 for implementing stochastic multipliers with different number of inputs (i=2, 3, 4) and data precisions (n=4, 8). Three different designs were implemented for each case: one limited-precision design that produces n-bit precision output ($2^n$-bit output bit-stream) and two full-precision designs that produce (i×n)-bit precision output ($2^{i\times n}$-bit output bit-stream). The proposed bit-stream generator provides significantly lower hardware cost for all limited-precision designs and also for the full-precision designs with at most 12-bit output precision. A weakness of the proposed generator is its high hardware cost for output precisions exceeding 12 bits. This is because producing an (i×n)-bit precision output requires implementing a separate $2^{i\times n}$-state FSM for each input. Although such high output precision (i.e., ≥12 bits) is rarely needed in today's common applications such as neural networks and image processing, we integrate our design with a rotation-based method of generating bit-streams for high-precision bit-streams.

Figure 9:
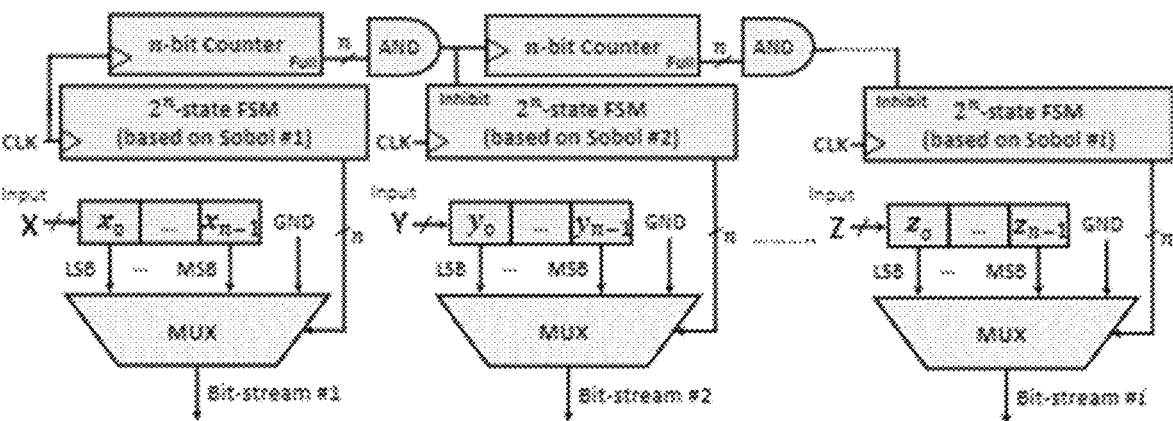
FIG. 9 shows a logic diagram of the FSM-based LD bit-stream generator and the rotation method of a deterministic approach to stochastic computation to generate i independent $2^{i \times n}$-bit bit-streams.

FIG. 9 shows the structure of the novel generator integrated with the rotation method. This integration allows to generate i $2^{i\times n}$-bit bit-streams by using i $2^n$-state FSMs (instead of i $2^{i\times n}$-state FSMs). This significantly reduces the hardware cost at no accuracy loss while producing full-precision output. The rotation technique guarantees a full-precision output by rotating the bit-streams through inhibiting or stalling on powers of the stream lengths. The output of the first FSM repeats every $2^n$ cycles and does not rotate. Other FSMs (FSM #k=2, 3, . . . , i) have a period of 2n but rotate every $2^{(k-1)\cdot n}$ cycles by inhibiting. As reported in FIG. 8, compared to the rotation-based design of the compared-based generator, the rotation-based design disclosed herein provides a lower hardware cost in all cases.

According to FIG. 8, the proposed bit-stream generator provides up to 80% saving in the hardware area cost. Considering the fact that for the same number of processing cycles the proposed generator provides a better or the same level accuracy as the comparator-based one (see FIG. 6), the proposed design achieves more than 80% savings in the area-delay product.

Hardware Cost—Parallel Bit-Stream Generator. Parallelization has been used to mitigate the long latency of SC at the cost of higher hardware area and power consumption. For example, a prior design in the art provides a hardware efficient parallel Sobol sequence generator that can generate multiple Sobol numbers in each clock cycle at the cost of some additional XOR gates. For an M× parallel comparator-based LD bit-stream generator, an M× parallel Sobol generator and M comparators are needed. This design reduces the number of processing cycles by a factor of M by generating M LD bit-streams of length $2^N$/M in parallel. A reasonable increase in the hardware cost but M× reduction in the latency makes the parallel design of the comparator-based LD generator an attractive alternative to the non-parallel implementation.

Figure 10A:
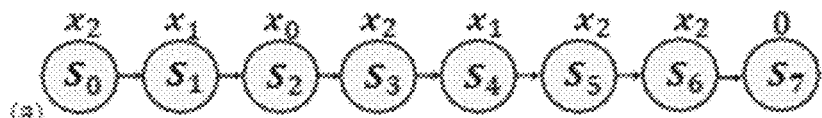
FIG. 10(a) depicts an example of the FSMs for converting a 3-bit precision data to 8-bit LD bit-stream non-parallel with 8 states, processed in eight clock cycles.
Figure 10B:
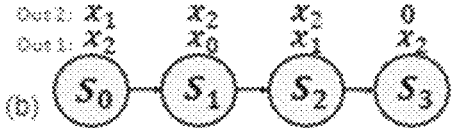
FIG. 10(b) depicts an example of the FSMs for converting a 3-bit precision data to 8-bit LD bit-stream 2× parallel with 4 states, processed in four clock cycles.
Figure 10C:
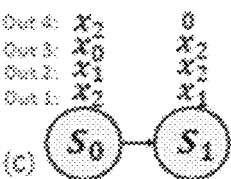
FIG. 10(c) depicts an example of the FSMs for converting a 3-bit precision data to 8-bit LD bit-stream 4× parallel with 2 states, processed in two clock cycles.

In one embodiment, the invention also includes a parallel design for the proposed bit-stream generator. In contrast to the non-parallel design which has $2^N$ states, the M× parallel design has $2^N$/M states. Each FSM state in the non-parallel design selects one bit of the input data. Each state in the M× parallel design, however, selects at most M bits of the binary input to generate M output bits in parallel. FIGS. 10(*a*)-(*c*) exemplifies the case of converting a 3-bit data into an 8-bit LD bit-stream. FIG. 10(*a*) shows the FSM of the non-parallel design. In this design, one input/output bit is selected/generated at any cycle. Conversion with this design takes eight cycles. The FSM of the 2× parallel design is shown in FIG. 10(*b*). At each cycle, two output bits are generated which reduces the number of processing cycles from eight to four. Finally, the FSM of the 4× design, shown in FIG. 10(*c*), produces four output bits at any cycle which reduces the processing time to only two clock cycles.

FIG. 13 compares the hardware cost of the 2×, 4×, and 8× parallel FSM-based LD generator (implemented based on the first five Sobol sequences from the MATLAB Sobol sequence generator) and the state-of-the-art parallel comparator-based LD generator for the case of converting 8-bit data to $2^8$-bit bit-stream. As it can be seen, both the non-parallel (1×) and the parallel designs of the FSM-based generator provide significantly lower hardware cost than their corresponding comparator-based design. The hardware cost saving provided by the FSM-based design increases when increasing the level of parallelism. On average, the 2×, 4×, and 8× design of the FSM-based generator achieves 66, 73, and 82 percent saving, respectively, compared to the corresponding comparator-based generator.

An interesting property of the proposed FSM-based design is that a higher level of parallelism can be achieved with no considerable increase in the hardware cost. In some cases, the area is even reduced with more parallelism. For instance, the non-parallel design of the FSM-based generator implemented based on Sobol sequence 1 takes an area footprint of 246 $\mu m^2$ while its 2×, 4×, and 8 $\chi$ parallel designs cost 266 $\mu m^2$, 267 $\mu m^2$, and 250 $\mu m^2$ area, respectively. This happens because by increasing the level of parallelism 1) the number of states decreases and 2) the same input bit is selected for more than one output bit (e.g., $x_2$ in the FSM of FIG. 10(*c*)).

Fault Tolerance. Fault tolerance is one of the attractive properties of SC designs. The processing elements of SC systems inherently tolerate high rates of soft errors (i.e., bit flips) as they process data in the stochastic domain. However, the bit-stream generators that convert binary data to stochastic bit-streams are vulnerable to bit flips as they operate in the binary domain. Here, the fault tolerance of the proposed FSM-based bit-stream generator is compared to that of the comparator-based generator when converting input data with different precisions (n=4, 8, and 12 bits) to LD bit-streams with corresponding lengths ($2^4$, $2^8$, and $2^{12}$ bits). Soft errors are injected by flipping bits in the input and output bits of different components of the bit-stream generator including the storage array of the Sobol generator for the comparator-based and the states of the FSM for the FSM-based generator. FIG. 14 shows the results. Evidently, increasing the precision reduces the error rate (improves fault tolerance) in both the proposed and the comparator-based generators. This is because longer bit-streams are generated for higher precisions, and longer bit-streams have higher tolerance to bit flips.

The novel FSM-based generator disclosed herein shows a slightly lower tolerance to soft errors compared to the comparator-based design. This is due to the high sensitivity of FSMs to changing their state caused by bit-flips. As it can be seen in the reported numbers of FIG. 14, the difference between the MAEs of the two LD generators increases when increasing the fault injection rate. However, the hardware cost saving provided by the proposed generator can be exploited to improve its tolerance to soft error by using additional techniques of improving fault tolerance such as the N-modular redundancy (N-MR).

For the comparator-based design, a 3-MR design was evaluated by implementing three identical copies of the main components of the generator and using majority gates to vote between them. For the FSM-based design, a 3-MR and a 5-MR design were implemented. FIG. 14 compares the hardware area cost and the MAE of the implemented generators for different noise injection rates. Clearly, implementing the N-MR technique has improved the fault tolerance of the generators. For example, for the case of injecting 1% soft error, the MAEs of the 5-MR implementations of the FSM-based generator are all below 0.01%, which shows over three orders of magnitude reduction in the error rate compared to the non-redundant implementation. The reported area numbers show that the 5-MR design of the FSM-based generator has a lower hardware cost than the 3-MR design of the comparator-based generator while achieving significantly lower error rates for noise injection rates below 10%. For higher injection rates, the comparator-based generator shows higher tolerance to noise.

The high hardware cost of the Sobol sequence generator in the comparator-based design makes it difficult for the designer to exploit techniques such as N-MR to improve soft error tolerance. However, supported by the area and MAE numbers reported in Table IV, the low-cost advantage of the proposed LD generator allows us to use additional techniques to improve the soft error tolerance of the bit-stream generator in the SC system.

Case Studies. To further evaluate the effectiveness of using the proposed bit-stream generator, we compare the cost of LD bit-stream generation in SC design of convolution functions with different sizes of k×k (k=3, 5, 7, 9, and 11). 8-bit precision data is converted from binary radix to LD bit-streams and fed to the convolution design. In convolution, pairs of input data are first multiplied and then the results are accumulated. For a higher output accuracy, the state-of-the-art SC convolution designs implement the multiplication operations in the stochastic domain (using AND gates) but perform the accumulation in the binary domain using binary adders. Since the accumulation is performed in the binary domain, the outputs of the multiplication operations do not need to be independent. This permits to reuse two LD patterns to convert all input data to bit-stream representation. We evaluate three LD bit-stream generation approaches:

(1) Comparator-based. Each input data is compared with a Sobol number using a separate binary comparator. Two different Sobol sequences are needed to provide the two required LD patterns. To minimize the cost of generating the two Sobol sequences, the first sequence is generated by simply reversing the output bits of a binary counter. The second Sobol sequence is generated by using a Sobol number generator known to those skilled in the art. So, the comparator-based approach consists of one 8-bit binary counter, one 8-bit Sobol generator, and k×k 8-bit comparators to convert the input data.

(2) FSM-based. Each input data is connected to the main inputs of a separate 9-to-1 MUX unit. Two 256-state FSMs, each implemented based on a different Sobol sequence, are connected to the select input of the MUX units. The two input data of each multiplication operation are connected to two separate MUX units while the select input of each MUX is fed with one of the two FSMs. So, the FSM-based design consists of two 256-state FSMs and k×k 9-to-1 MUX units.

Figure 11:
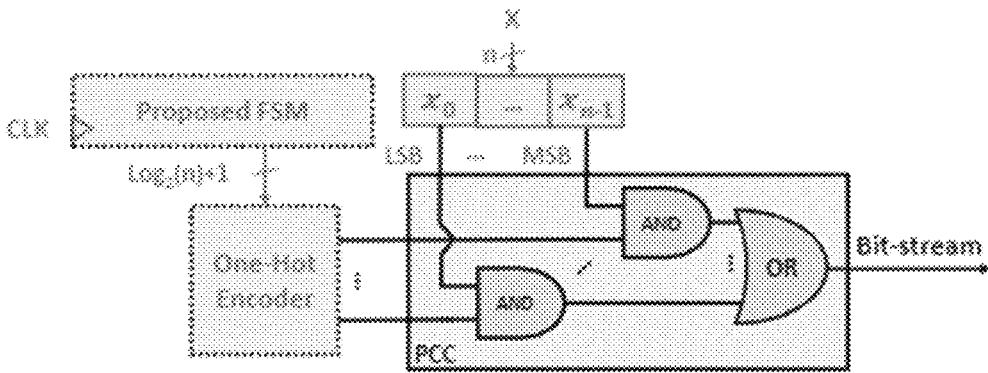
FIG. 11 shows a logic diagram of the Probability Conversion Circuit (PCC).

(3) FSM-based+One-Hot Encoder. In another embodiment, the invention also implements a third design to further reduce the cost of generating LD bit-streams for applications such as the targeted convolution that a few FSMs (in the instant case, two) is reused in converting a large number of inputs. In this approach, there is a need for a separate pair of FSM and one-hot encoder for each LD pattern. Converting each input also requires a Probability Conversion Circuit (PCC) made of standard AND and OR gates. FIG. 11 shows the design of the PCC unit. As seen in FIG. 11, the PCC unit is comprised of at least two AND gates and an OR gate, wherein the outputs of the AND gates comprise the inputs of the OR gate. The input of the One-Hot Encoder comprises the outputs of the FSM in an amount equal to $Log_2(n)+1$. One input of each AND gate is the outputs of the One-Hot Encoder. The second input of each AND gate comprises a bit of input X. From the PCC, a bit stream is generated. PCC has a lower hardware cost than MUX. Hence, when converting a large number of inputs, using PCCs instead of MUXs results in a considerable hardware cost saving.

Figure 12:
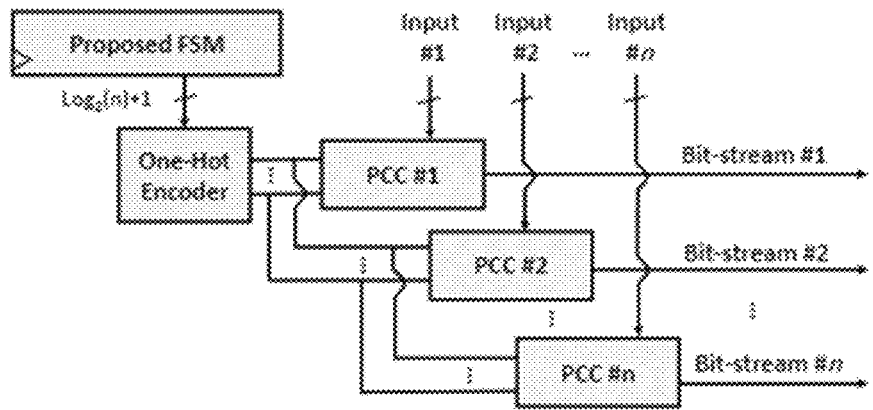
FIG. 12 shows the logic diagram of the method of converting a large number of inputs from binary to LD bit-stream representation by sharing one one-hot encoder and one FSM.

FIG. 12 shows the conversion circuit for converting n input data by sharing one FSM and one one-hot encoder. For the targeted convolution design, two 256-state FSMs (each implemented based on a different Sobol sequence), two one-hot encoders, and k×k PCCs are needed. To convert a large number of inputs from binary to LD bit-stream representation through one one-hot encoder and one FSM, one can apply the logic shown in FIG. 12. There, the one-hot encoder outputs are inputs for each PCC circuit, which each outputs one bit-stream.

Note that no comparison is made with certain prior art bit-stream generation approach that generate one LD and one unary bit-stream. The novel design disclosed herein needs two independent LD bit-streams. The described bit-stream generation approaches are implemented for different convolution sizes of 3×3, 5×5, 7×7, 9×9, and 11×11 using Verilog HDL and synthesized using the Synopsys Design Compiler v2018.06-SP2 with the 45 nm Free PDK library. The synthesis results are reported in FIG. 15. As can be seen, the proposed FSM+one-hot encoder design provides the minimum bit-stream generation cost by reducing the hardware area cost up to 54% compared to the comparator-based design. Critical path latency and power consumption are also reduced with this approach. Energy consumption is further decreased up to 67% compared to the comparator-based design. This reduction in hardware cost is expected to have a significant impact on the hardware efficiency of the SC-based CNNs known to those skilled in the art.

LD bit-streams have shown the best performance among all types of stochastic bit-streams. The state-of-the-art LD bit-stream generators are costly and not efficient for all SC designs. The instant application discloses a low-cost FSM-based LD bit-stream generator for SC designs that need multiple independent bit-streams. The proposed generator design reduces the hardware cost up to 80% while generating accurate bit-streams. The parallel design of our bit-stream generator provides on average 66 percent area saving for the 2× and 82 percent area saving for the 8× parallel implementation compared to the state-of-the-art parallel LD bit-stream generator. The inventors have shown that the area saving provided by the novel design can be exploited to improve the fault-tolerance of the bit-stream generator, a vulnerable component in SC systems. For noise injection rates below 10 percent, the 5-MR design of the proposed generator provides orders of magnitude reduction in the error rate at a lower hardware cost than the 3-MR comparator-based design. By evaluating the overhead cost of bit-stream generation for SC convolution design, significant area and energy consumption savings were achieved by using the proposed bit-stream generator. A new design for further cost reduction of the FSM-based LD bit-stream generator was also developed for the case of generating a large number of bit-streams.

The foregoing description sets forth exemplary methods, parameters, and the like. It should be recognized, however, that such description is not intended as a limitation on the scope of the present disclosure but is instead provided as a description of exemplary embodiments.

In the foregoing description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present invention include process steps and instructions described herein in the form of an algorithm. It should be noted that the process steps and instructions of the present invention could be embodied in software, firmware, or hardware, and, when embodied in software, they could be downloaded to reside on, and be operated from, different platforms used by a variety of operating systems.

The present invention also relates to a device for performing the operations herein. This device may be specially constructed for the required purposes or it may comprise a general-purpose computer selectively activated or reconfigured by a computer program stored in the computer. Such a computer program may be stored in a non-transitory, computer-readable storage medium such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application-specific integrated circuits (ASICs), or any type of media suitable for storing electronic instructions and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention, as described herein.

Although the description herein uses terms first, second, etc., to describe various elements, these elements should not be limited by the terms. These terms are only used to distinguish one element from another.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The above description is presented to enable a person skilled in the art to make and use the disclosure, and it is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown but is to be accorded the widest scope consistent with the principles and features disclosed herein. Finally, the entire disclosure of the patents and publications referred in this application are hereby incorporated herein by reference.

We claim:

1. A finite state machine for generating a bit stream for a stochastic computing system comprising a 2n-state finite state machine, wherein the finite state machine is set up using the following steps:

(a) inputting a Sobol sequence to the finite state machine, wherein the Sobol sequence comprises one or more Sobol numbers;

(b) causing Sk to represent a kth number of the inputted Sobol sequence;

(c) causing if $(2m-1-1)/2m-\leq S_k<(2m-1)/2^m$ (where m=1, 2, . . . , n), $x_{n-m}$ or an (n–m)th bit of a binary input X should be selected by the finite state machine;

wherein m comprises an integer number between 1 to n; and wherein n comprises the Sobol sequence's data precision;

(d) wherein the finite state machine is implemented in hardware as part of a stochastic computing system, providing a practical application of the mathematical model in a computing environment;

wherein the output of the finite state machine is processed by a one-hot encoder;

wherein the outputs of the one-hot encoder are received as inputs by a probability conversion circuit; and wherein the probability conversion circuit comprises:

at least two AND gates; and at least one OR gate.

\* \* \* \* \*